United States Patent [19]

Boscaro Gatti et al.

[11] Patent Number: 4,459,113
[45] Date of Patent: Jul. 10, 1984

[54] DEVICE FOR SPECIALIZING IN THE USE OF ENDOSCOPES

[76] Inventors: Antonino E. Boscaro Gatti, Diputación, 304 Principal, Barcelona-9; Emilio Andres Arranz, Selva de Mar, 255, Barcelona 20, both of Spain

[21] Appl. No.: 409,603

[22] Filed: Aug. 19, 1982

[30] Foreign Application Priority Data

Aug. 31, 1981 [ES] Spain ................................. 260340

[51] Int. Cl.³ ............................................. G09B 23/30
[52] U.S. Cl. .................................................. 434/272
[58] Field of Search ............... 434/265, 266, 267, 268, 434/272; 273/1 GA, 1 GB

[56] References Cited

U.S. PATENT DOCUMENTS

| | | | |
|---|---|---|---|
| 2,207,153 | 7/1940 | Judovich | 434/272 |
| 2,345,489 | 3/1944 | Lord | 434/272 |
| 2,943,855 | 7/1960 | Javna | 273/1 GA |
| 3,209,469 | 10/1965 | James | 434/265 |
| 3,376,659 | 4/1968 | Asin | 434/272 |
| 4,332,569 | 6/1982 | Burbank | 434/272 |

Primary Examiner—Harland S. Skogquist
Attorney, Agent, or Firm—Wenderoth, Lind & Ponack

[57] ABSTRACT

In the interior of a human-like dummy and at a suitable port, there is located a support or similar element which will act as the support element for a live-scale model of a region of the digestive system, advantageously comprising the esophagus, the stomach, duodenum and initiation of the jejunum, made from a material which insures imitation both in shape and in color, texture and anatamy of a human digestive system. The device is surrounded at diverse levels by a series of conducting elements, joined together by means of an electric cable whose end is joined to a terminal of an aural alarm, while the opposite terminal of the alarm is joined to a second electric conductor which will follow the complete digestive system. The conductor is fixed by an indefinite number of contacts which surround the digestive system at zones located below the conducting bridges, each one of which will incorporate adjustable contact screws which will facilitate the adjustment thereof.

2 Claims, 2 Drawing Figures

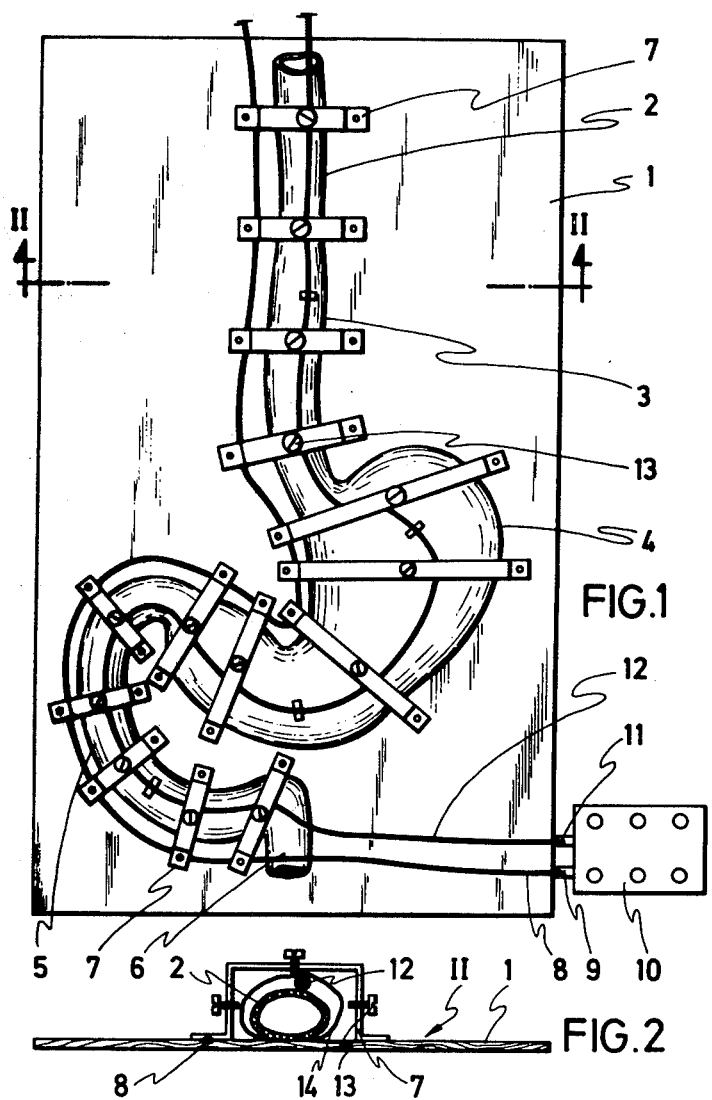

DEVICE FOR SPECIALIZING IN THE USE OF ENDOSCOPES

BACKGROUND OF THE INVENTION

1 Field of the Invention

The present invention refers to a device which has specially been designed to allow physicians to specialize in the use of a fibroscope, thereby reducing both the period of such training and the dangers which could be derived from the use of this apparatus by inexperienced physicians.

2 Description of the Prior Art

The use of the fibroscope, as a means for exploring the digestive system, is at its peak mainly due to the advantageous presented by the device when compared with conventional systems (radiographs and the like), inasmuch as it permits a direct observation of the interior of the upper regions of the digestive system (esophagus, stomach, duodenum and initiation of the jejunum) as well as the lower regions (rectum, marcocolic to the ileocecal valve).

The fibroscope, contrary to that which occurs with the previously used rigid instruments and apparatus, permits a direct and flexible observation of the walls of the mentioned interior regions of the digestive system, which exploration insures an easier detection of any malformation of pathology, while it facilitates the simultaneous obtention of biopsies which will subsequently permit the evaluation of the discovered pathology.

However, an improper use of the fibroscope, basically due to an inadequate training in the handling thereof, can lead to very serious problems and can even cause the death of the patient.

These problems arise when the fibroscope, used by inexperienced hands, presses on the walls of a segment of the digestive systems, which such a force that it produces lesions, even perforations, resulting in peritonitis or any other type of complication, therefore putting the life of the patient in danger, as previously mentioned.

If, during the use of the fibroscope, the walls of the digestive system are merely chafed, this type of sliding does not produce any negative effect thereon. However, the negative effect would be produced in the event the chafing is prolonged with such a force that the mentioned wall can be torn or even perforated, as stated in the preceding paragraph.

It is possible at present, only on the basis of a careful training carried out on patients, to achieve a good knowledge of the handling of the fibroscope, but the importance of the problems which can be derived from this type of training is immediately comprehensible.

SUMMARY OF THE INVENTION

To obviate difficulty of use and danger to patients, reducing on the other hand the period of training for physicians, there has been designed the present invention which will facilitate the suitable training of the physician, using the device while, logically, reducing the danger for the patient on whom the physician should perform his first real exploration.

To achieve such purpose, the device of the present invention adopts the general shape of the interior regions of the digestive system, mouth, pharynx, esophagus, stomach, duodenum and initiation of the jejunum, such dummy being made from a material, preferably latex or silicone, which will permit the simulated organs to acquire both the general texture, such as the morphology, flexibility, characteristics of color and others, making them coincident with the human digestive system, and manifestations of ulcers, diverticulitis, cancer or any other pathological disfigurement on various spots of the digestive system.

The imitation of a digestive system, which will normally be located on a support or similar element, advantageously inserting the assembly in a dummy to proportion it with a human-like appearance, will be surrounded by a plurality of sensing elements, adjustable at will, generally adopting the shape of a bridge which embraces the tube at a suitable distance, all of them being joined by means of an electric conductor whose end will be joined to a terminal of an electronic alarm, while the other terminal will be joined to another conductor which will be fixed to the model of the digestive system so that it slides joined thereto and below the described sensing elements.

With the device thus arranged and connected to the electronic circuit, since the cables are not joined, the current will not be produced and consequently the alarm will not function.

At this moment the endoscopist student will initiate the insertion of the fibroscope in the interior of the digestive system, through the mouth of the dummy passing to the interior through the pharynx, being directed towards the esophagus and following therealong, until the region of the apparatus which has been represented in the device has been covered.

If, during the exploration, the fibroscope slightly chafes the walls of the digestive system, nothing will happen and at the end of the test the endoscopist will be aware of having carried out the exploration correctly and he will have an excellent knowledge with respect to the handling of the fibroscope.

If, on the contrary, at any time during the exploration, the operator supports the end of the fibroscope on any wall of the digestive system and instead of correcting himself, he continues pressing in the case of a patient, the alarm will function before a lesion is produced, since the assembly is so dimensioned that at this moment, the conductor which is joined to the digestive system is pushed towards the sensing elements which surround it and, by means thereof, said conductor is joined to the other conductor which connects all the described sensing elements together, wherefore the circuit will be closed and the alarm will start to function, ceasing to function when pressure is no longer exerted.

Therefore, the reaction of the alarm will be equivalent to the reaction which a human being would adopt if the endoscopy were to be performed on a real patient, since it is a type of alarm which generates a noise resembling that which would be produced by a person to give it more realism and to collaborate, to a greater extent, in a perfect adaptation of the device to the real operation which it should resemble.

The aforegoing description sets forth the important advantages which a device such as that described can contribute in the education of endoscopists, inasmuch as it shortens the period of training, insuring better knowledge on the part of the physicians and, consequently, a better utilization of the fibroscope in this type of operation without producing negative effects on the patient.

To clarify the explanation, there is attached to this specification a sheet of drawings illustrating, by way of an illustrative but not a limiting example, a mode of embodiment of a device for specializing in the use of endoscopes, according to the principles of the invention.

BRIEF DESCRIPTION OF THE DRAWINGS

In the drawings:

FIG. 1 illustrates an elevational view of the assembly of the device which is the object of the present invention.

FIG. 2 illustrates a cross-sectional plan view along line II—II of FIG. 1, of the device of the present invention.

DETAILED DESCRIPTION OF THE PREFERRED EMBODIMENTS

As can be seen from FIG. 1 of the drawings, on a support 1, which will in fact be advantageously situated in the interior of a human-like dummy, there is placed an imitation 2 of the human digestive system, basically in the region comprising the mouth, pharynx, esophagus 3, stomach 4, the duodenum 5, and the initiation of the jejunum 6, which will advantageously be made from a material such as latex or silicone, which will imitate the anatomy of the human digestive system.

As best shown in FIG. 2, the apparatus 2 is surrounded, at suitable distances, by a plurality of sensing elements 7 arranged at regulary spaced distances provided with adjusting screws 13, all of which are joined to one another by an electric conductor 8 which is joined to one terminal 9 (FIG. 1 only) of an electronic alarm 10 (FIG. 1 only), while the other terminal 11 is joined to another conductor 12 which is fixed to the digestive system, along the complete length thereof, by conducting strips 14 which surround it below the sensing elements 7.

While the endoscopist is performing an exploration with the fibroscope and he does not press on the walls of the digestive system 2, nothing will happen. In the event a pressure is exerted on any area of the wall thereof, the assembly has so been made that when this pressure is equal to that which would produce a pernicious effect on the patient, the conducting strip 14 establishes contact with a sensing element 7 placed on any one of the bridges, which will close the circuit between the conductor 12 and the return conductor 8 which will cause the alarm to function, emitting a sound equivalent to that which, besides the so often irreversible consequences which can be produced by said actuation, would be emitted by the patient in this case, which will help the endoscopist student to verify that an error has been produced which should immediately be overcome and which should be taken into account throughout the test.

We claim:

1. A device for specializing in the use of endoscopes, located in the interior of a human-like dummy at a suitable spot, comprising:
   a live-scale model of a region of the digestive system, including the esophagus, the stomach, duodenum and the initiation of the jejunum, made from a material which insures the imitation both in shape and in color, texture and anatomy of a human digestive system,
   a support element for the live-scale model,
   a series of sensing elements surrounding the live-scale model at diverse levels,
   a first electric conductor joining together the series of sensing elements,
   an aural alarm having a first terminal joined to the end of the first electric conductor and also having a second terminal,
   a second electric conductor, joined to the second terminal of the aural alarm, for following the live-scale model of the complete digestive system,
   a plurality of conducting strips, fixed to the second electric conductor, for surrounding the live-scale model of the digestive system at various zones, each located below one in the series of sensing elements, and
   a plurality of screw means for adjusting the contact distance between each strip in the plurality of conducting strips and each element in the series of sensing elements.

2. A device for specializing in the use of endoscopes according to claim 1, characterised in that:
   the second electric conductor, which is joined to said live-scale model of the digestive system, chafes any one of the series of sensing elements and closes an electric circuit between said second electric conductor and said one of the series of the sensing elements, thus causing the aural alarm to sound.

* * * * *